United States Patent [19]

Yamamoto et al.

[11] Patent Number: 5,307,156
[45] Date of Patent: Apr. 26, 1994

[54] TELEVISION SIGNAL CONVERTING APPARATUS

[75] Inventors: Toshinori Yamamoto; Hisashi Ishikawa, both of Yokohama, Japan

[73] Assignee: Canon Kabushiki Kaisha, Tokyo, Japan

[21] Appl. No.: 92,763

[22] Filed: Jul. 16, 1993

Related U.S. Application Data

[63] Continuation of Ser. No. 4,225, Jan. 11, 1993, abandoned, which is a continuation of Ser. No. 690,500, Apr. 24, 1991, abandoned.

[30] Foreign Application Priority Data

Apr. 26, 1990 [JP] Japan .................................. 2-108910
Apr. 26, 1990 [JP] Japan .................................. 2-108911

[51] Int. Cl.$^5$ .................................................. H04N 7/01
[52] U.S. Cl. ................................................ 358/11; 358/140
[58] Field of Search ............... 358/11, 12, 140, 141, 358/160; H04N 7/01, 5/46

[56] References Cited

U.S. PATENT DOCUMENTS

| | | | |
|---|---|---|---|
| 4,449,143 | 5/1984 | Dischert | 358/11 |
| 4,605,952 | 8/1986 | Powers | 358/12 |
| 4,628,344 | 12/1986 | Glenn | 358/12 |
| 4,791,487 | 12/1988 | Kozuki | 358/140 |
| 4,953,025 | 8/1990 | Saitoh | 358/140 |
| 5,021,870 | 6/1991 | Motoe | 358/11 |
| 5,043,811 | 8/1991 | Yasuhiro | 358/11 |
| 5,045,939 | 9/1991 | Okayama | 358/140 |
| 5,103,308 | 4/1992 | Asano | 358/11 |
| 5,122,885 | 6/1992 | Yoshioka | 358/310 |

*Primary Examiner*—Mark R. Powell
*Attorney, Agent, or Firm*—Robin, Blecker, Daley & Driscoll

[57] ABSTRACT

A television format converting apparatus converts a first television signal based on a predetermined format, which includes a luminance signal component and color signal component, into a second television signal based on other television format of a different aspect ratio, which includes a luminance signal component and color signal component. The first television signal is digitalized and then converted into a digitized second television signal. The digitized second signal is converted an analog signal in synchronization with a frequency of four times of a color sub-carrier frequency, so that hardware structure of the apparatus can be significantly simplified and the exact conversion of television signals can be realized.

38 Claims, 6 Drawing Sheets

TELEVISION SIGNAL CONVERTING APPARATUS

This is a continuation application under 37 CFR 1.62 of prior application Ser. No. 08/004,225, filed Jan. 11, 1993 now abandoned.

This is a continuation application under 37 CFR 1.62 of prior application Ser. No. 690.500, filed Apr. 24, 1991 now abandoned.

BACKGROUND OF THE INVENTION

1. Field of the Invention

The present invention relates to a television signal converting apparatus for converting a television signal of a certain system into that of another system.

2. Related Background Art

For a down-conversion of a television signal of a high definition television system such as so-called hi-vision (hereinafter called HDTV signal) into a television signal for example of NTSC system (hereinafter called NTSCTV signal), there is already proposed a television signal converting apparatus as schematically shown in a block diagram in FIG. 1.

Figure 1:
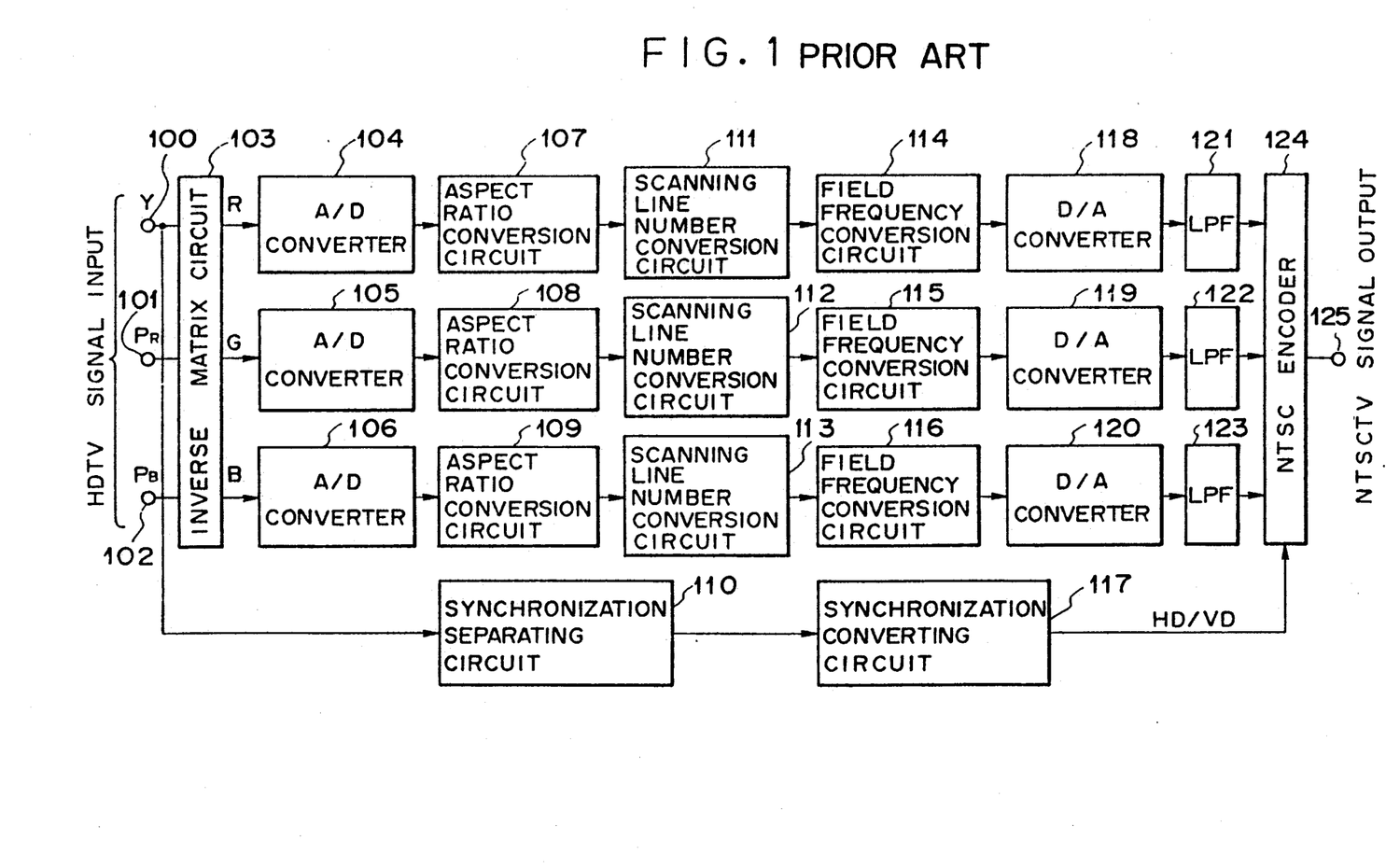
FIG. 1 is a schematic block diagram of a conventional television signal converting apparatus.

Referring to FIG. 1, the luminance signal Y and two color difference signals $P_R$, $P_B$ of the HDTV signal are entered from input terminals 100, 101, 102, and are converted by an inverse matrix circuit 103 into three primary color signals of R (red), G (green) and B (blue). These converted R, G and B color signals are respectively converted by A/D converters 104, 105, 106 into digital signals, then subjected to a conversion of aspect ratio by aspect ratio converting circuits 107, 108, 109 from an aspect ratio of 16:9 based on the HDTV signal to 4:3 based on the NTSCTV signal, further subjected to a conversion of the number of scanning lines in the vertical direction by scanning line number converting circuits 111, 112, 113 from 1125 lines based on the HDTV signal to 525 lines based on the NTSCTV signal, and further subjected to a conversion of the field frequency by field frequency converting circuits 114, 115, 116 from a field frequency of 60 Hz based on the HDTV signal to 59.94 Hz based on NTSCTV signal. Thus processed signals are converted again by D/A converters 118, 119, 120 into analog signals, then subjected to a band limitation by low-pass filters (LPF) 121, 122, 123, and entered into an NTSC encoder 124.

On the other hand, the luminance signal Y of the HDTV signal entered from the input terminal 100 is also supplied to a synchronization separation circuit 110, in which the synchronization signal based on the HDTV signal is separated, then converted into a synchronization signal HD/VD based on the NTSC system in a synchronization conversion circuit 117, and is supplied to the above-mentioned NTSC encoder 124.

The NTSC encoder 124 encodes the R, G and B color signals and HD/VD synchronization signal entered thereto, and releases an encoded signal from an output terminal 125.

Figure 2:
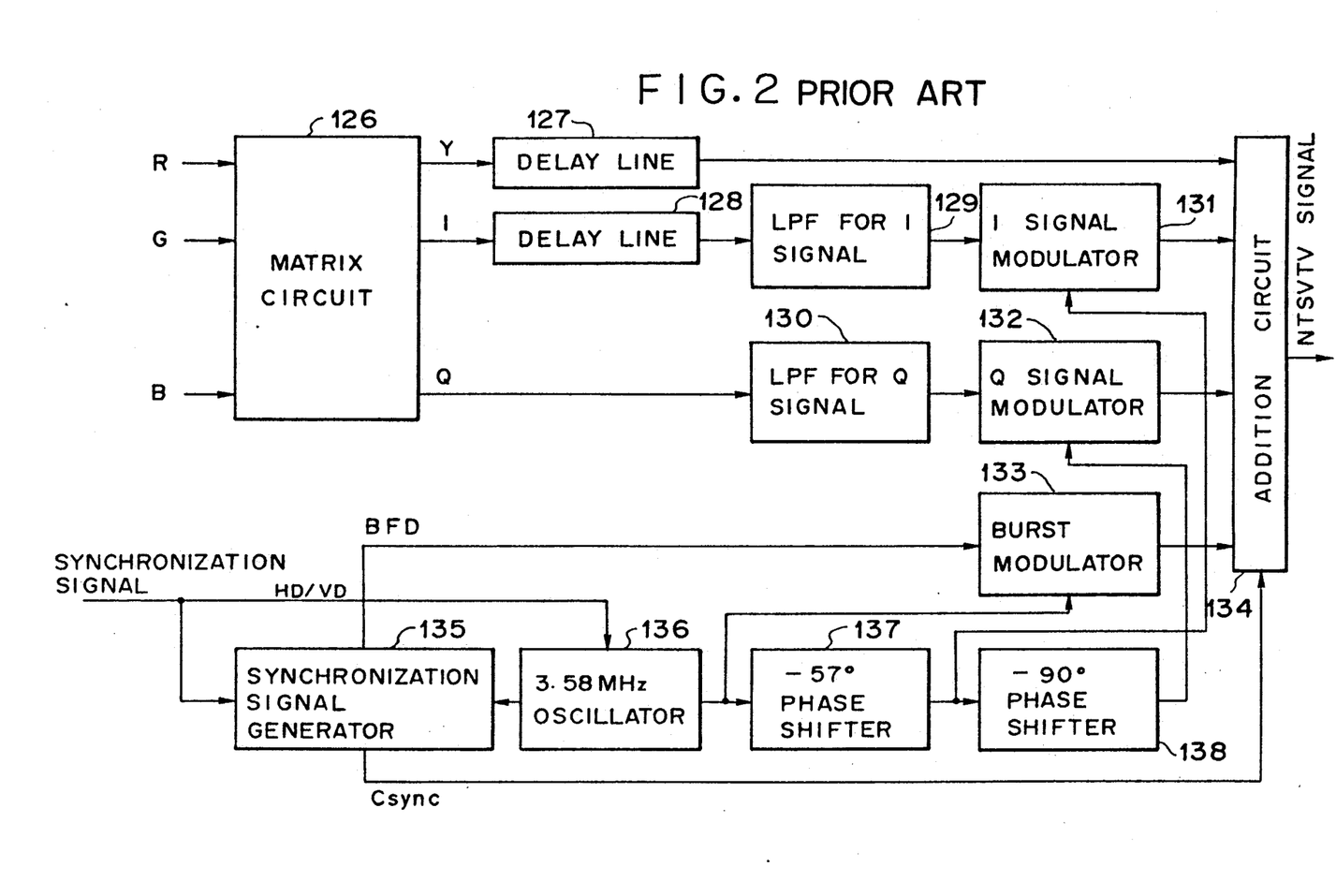
FIG. 2 is a detailed block diagram of an NTSC encoder shown in FIG. 1.

FIG. 2 is a block diagram showing the details of the NTSC encoder 124 shown in FIG. 1.

Referring to FIG. 2, the entered R, G and B color signals are supplied to a matrix circuit 126 to generate a luminance signal Y and color difference signals I, Q based on the NTSCTV signal system. The luminance signal Y is supplied through a delay line 127 to an addition circuit 134, while the color difference signal I is guided through a delay line 128 and an I signal low-pass filter 129, then balance modulated in an I signal modulator 131 and supplied to said addition circuit 134, and the color difference signal Q is guided through a Q signal low-pass filter 130, then balance modulated by a Q signal modulator 132 and supplied to the addition circuit 134.

On the other hand, the entered synchronization signal HD/VD is supplied to a synchronization signal generator 135 and an oscillator 136 for generating a carrier signal of 3.58 MHz. The synchronization signal generator 135 generates burst flag pulses BFP and a composite synchronization signal Csync. The carrier signal of 3.58 MHz generated by the oscillator 136 is supplied to a burst modulator 133 and a phase shifter 137 of −57°. The burst flag pulses BFP are modulated in said burst modulator 133 by the carrier signal of 3.58 MHz and supplied to the addition circuit 134, to which the composite synchronization signal Csync is also supplied. The carrier signal of 3.58 MHz from the oscillator 136 is further supplied, after phase shifting by the phase shifter 137 of −57°, to a phase shifter 138 of −90°, and the carrier signals of a mutual phase difference of 90° generated by phase shifts in said phase shifters 137, 138 are utilized in the balance modulation of the color difference signals I, Q in said modulators 131, 132. The addition circuit 134 multiplexes the various signals supplied thereto as explained above, thus generating an NTSCTV signal.

However, the television signal converting apparatus involves drawbacks in that the hardware structure is complex and includes many adjusting points, since the luminance signal Y and color difference signals $P_R$, $P_B$ of the HDTV signal are once converted by the inverse matrix circuit 103 into R, G and B color signals, then digitized, further subjected to conversions of aspect ratio, number of scanning lines and field frequency, then returned to analog signals and are encoded into the NTSCTV signal.

For example, in the conversion of the number of scanning lines, since the HDTV signal has 1,125 scanning lines while the NTSCTV signal has 525 lines, it is necessary to form 7 scanning lines of the NTSCTV signal from 15 scanning lines of the HDTV signal. Consequently, in the scanning line conversion even with a simple linear interpolation, there is required a capacity of 14 H (H being a horizontal scanning period) of the HDTV signal in the line memory to be used, and there will be required three identical circuits in order to process the R, G and B signals. Besides the NTSC encoder 124 of the structure as shown in FIG. 2 requires a considerable amount of hardware for achieving exact encoding, and involves a number of adjusting points because the encoding operation is conducted in the analog state.

SUMMARY OF THE INVENTION

An object of the present invention is to provide a television signal converting apparatus capable of resolving the drawbacks mentioned above.

Another object of the present invention is to provide a television signal converting apparatus capable of exact conversion of television signal.

In an aspect of the present invention, the above-mentioned objects can be attained by a television signal converting apparatus for converting a first television signal containing a luminance signal component and a chrominance signal component into a second television signal likewise containing a luminance signal component and a chrominance signal component, comprising:

analog/digital converter means for digitizing the first television signal in synchronization with a frequency of four times of the color sub carrier frequency of said first television signal;

television signal converter means converting the digitized first television signal from said analog/digital converter means into a digitized second television signal; and digital/analog converter means for converting the digitized second television signal from said television signal converter means into an analog signal in synchronization with a frequency of four times of the color sub carrier frequency of the second television signal.

Still another object of the present invention is to provide a television signal converting apparatus which can simplify the hardware structure, thereby reducing the cost of the apparatus.

In another aspect of the present invention, the above-mentioned object can be attained by a television signal converting apparatus for converting a first television signal containing a luminance signal component and chrominance signal component into a second television signal likewise containing a luminance signal component and a chrominance signal component, comprising:

analog/digital converter means for digitizing the first television signal in synchronization with a frequency of four times of the color sub carrier frequency of said first television signal thereby releasing a digital television signal;

time base varying means for varying the time base of the digital television signal released from said analog/digital converter means;

band limiting means for applying a band limitation on the digital television signal released from said time base varying means; and digital/analog converter means for converting the digital television signal released from said band limiting means into an analog signal in synchronization with a frequency of four times of the color sub carrier frequency of the second television signal.

Still other objects of the present invention, and the features thereof, will become fully apparent from the following detailed description of the embodiments of the present invention, which is to be taken in conjunction with the attached drawings.

DETAILED DESCRIPTION OF THE PREFERRED EMBODIMENTS

Now the present invention will be clarified in detail by embodiments thereof shown in the attached drawings.

Figure 3:
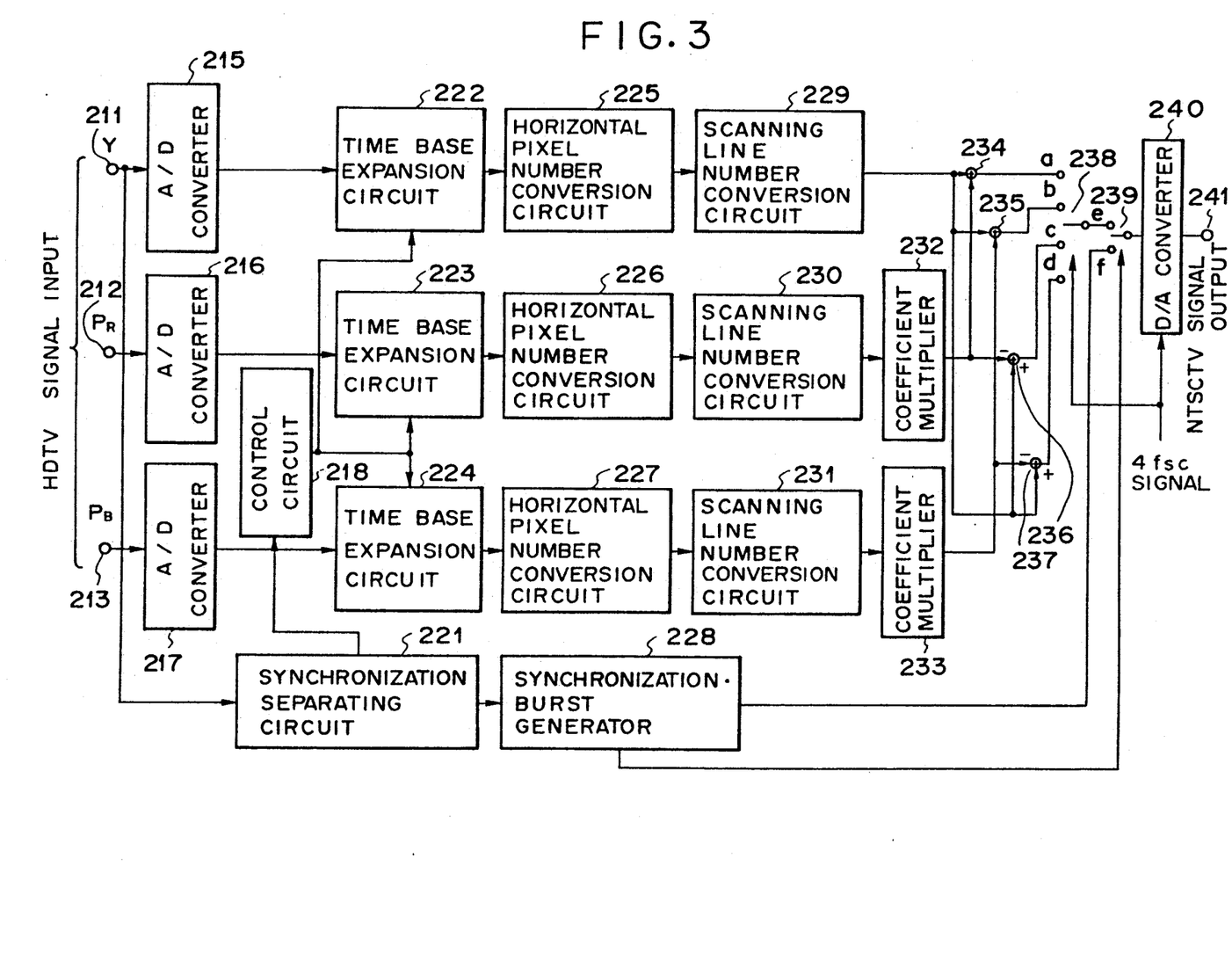
FIG. 3 is a schematic block diagram of a television signal converting apparatus constituting a first embodiment of the present invention.

FIG. 3 is a schematic block diagram of a television signal converting apparatus constituting a first embodiment of the present invention. In FIG. 3, there are shown input terminals 211, 212, 213 for receiving the luminance signal Y and the color difference signals $P_R$, $P_B$ of the HDTV signal; A/D converters 215, 216, 217 for converting the entered luminance signal Y and color difference signals $P_R$, $P_B$ into digital signals; a control circuit 218 for controlling time base extension circuits 222, 223, 224 to be explained later, for the purpose of extracting pixel signals corresponding to the effective image frame of the NTSCTV signal, from the converted luminance signal and color difference signals in said time base expansion circuits 222, 223, 224; a synchronization separation circuit 221 for separating a synchronization signal from the entered luminance signal Y; time base expansion circuit 222, 223, 224 for expanding the time base thereby releasing pixel signals of each horizontal scanning period corresponding to the effective image frame of the NTSCTV signal; and horizontal pixel number conversion circuits 225, 226, 227 for converting the number of pixels in each horizontal scanning period, based on the pixel signals subjected to time base expansion in said time base expansion circuits 222, 223, 224. In the above explained structure, in order to extract the pixel signals corresponding to the effective image frame obtained when the pixel signals from the A/D converters 215, 216, 217 are samples with a frequency of four times of the color sub carrier frequency $f_{sc}$ of the NTSCTV signal, the time base expansion circuits 222, 223, 224 expand the time base of the pixels signals supplied from the A/D converters 215, 216, 217 and the horizontal pixel number conversion circuits 225, 226, 227 convert the number of pixels in each horizontal scanning period, whereby the pixel signals are generated in succession with the timing of the above-mentioned frequency $4f_{sc}$. There are also provided a synchronization burst generator 228 for generating a synchronization signal and a color burst signal of the NTSCTV signal; scanning line conversion circuits 229, 230, 231 for converting the number of scanning lines; coefficient multipliers 232, 233 for matching the amplitudes of the color difference signals; adders 234, 235; subtractors 236, 237; and selector switches 238, 239 for switching the signals from said adders 234, 235 and subtractors 236, 237 and the color burst signal from said synchronization burst generator 228 according to a synchronization signal generated by said burst generator 228. Said adders 234, 235, subtractors 236, 237 and switches 238, 239 are so constructed that the pixel signals corresponding to two color difference signals are subjected to two-phase orthogonal modulation. There are further provided a D/A converter 240 for converting the pixel signals released from the selector switch 239 into an analog signal; and an output terminal 241 of the NTSCTV signal.

Figure 4:
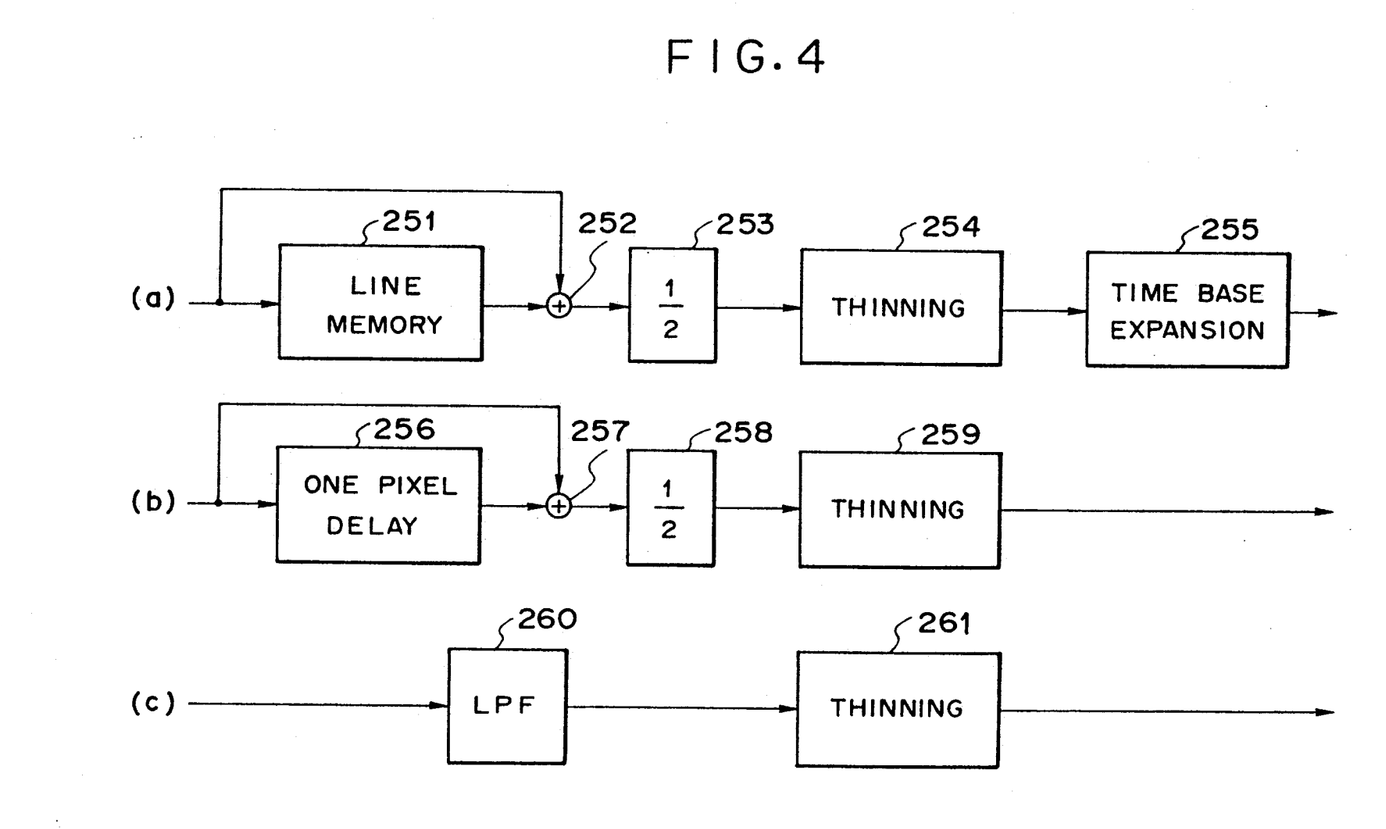
FIG. 4 is a block diagram showing details of circuits in FIG. 3, wherein (a) shows an example of a scanning line number conversion circuit, while (b) and (c) show examples of a horizontal pixel number conversion circuit.

FIG. 4 is a block diagram showing the details of different circuits in FIG. 3. FIG. 4(a) shows an example of the scanning line number conversion circuits 229, 230, 231, wherein shown are a line memory 251 for holding the pixel signals of a horizontal scanning period; and adder 252; a ½ multiplier 253 for multiplying a coefficient "¼"; a thinning circuit 254; and a time base expansion circuit 255. FIGS. 4(b) and 4(c) show examples of the horizontal pixel number conversion circuit 225 for the luminance signal Y, wherein shown are a one-pixel delay circuit 256; an adder 257; a ½ multiplier 258; a thinning circuit 259; a low-pass filter 260; and a thinning circuit 261.

Referring to FIG. 3, the luminance signal Y and the color difference signals $P_R$, $P_B$ of the HDTV signal supplied through the input terminals 211, 212, 213 are respectively converted into digital signals by the A/D converters 215, 216, 217 and supplied to the time base expansion circuits 222, 223, 224 which expand the time base of each horizontal scanning period by 4/3 times, thereby releasing the pixel signals of each horizontal scanning period corresponding to the effective image frame of the NTSCTV signal. Also the horizontal pixel number conversion circuits 225, 226, 227 match the number of pixels in each horizontal scanning period with the effective number of pixels when the NTSCTV signal is sampled with the above-mentioned frequency $4f_{sc}$. If the A/D converter 215 for the luminance signal Y has a sampling frequency of 74.25 MHz (based on BTA studio standards), the effective number of pixels in a horizontal scanning period becomes 1920 pixels (based on BTA studio standards), and, since the time base is expanded 4/3 times by the time base expansion circuit 222, the effective number of pixels in a horizontal scanning period supplied to the horizontal pixel number conversion circuit 225 becomes 1920×¾=1440 pixels. On the other hand, the effective number of pixels of the luminance signal Y of the NTSCTV signal in a horizontal scanning period is 760 pixels (with an effective horizontal scanning rate of 0.84) in case of a sampling frequency of $4f_{sc}$, so that the pixel signal of a pixel can be formed from that of two pixels released from the time base expansion circuit 222. Consequently the horizontal pixel number conversion circuit 225 for the luminance signal Y is so constructed, as shown in FIG. 4(b), as to average the pixel signal of two pixels to obtain that of a pixel, or, as shown in FIG. 4(c), to effect pixel thinning by a thinning circuit 261 after a band limitation by a low-pass filter 260, thereby obtaining the effective pixel number (for example 760 pixels) of the NTSCTV signal.

On the other hand, with respect to the color difference signals $P_R$, $P_B$, if the A/D converters 216, 217 have a sampling frequency of 37.125 MHz (based on BTA studio standards) which is ½ of the sampling frequency for the luminance signal Y, the effective number of pixels in a horizontal scanning period becomes 960 pixels (based on BTA studio standards), and said effective pixel number becomes 720 pixels by a time base expansion of 4/3 times in the time base expansion circuits 223, 224. However the band width of the color difference signals of the HDTV signal is as large as about 15 MHz, so that the equivalent band width after passing the time base expansion circuits 223, 224 and the scanning line number conversion circuits 230, 231 is still as large as 15×¾×½=5.6 MHz. Consequently there will result color crossing in the conversion to the NTSCTV signal, due to the difference in band width from the color difference signals of said NTSCTV signal. Consequently the horizontal pixel number conversion circuits for the color difference signals limit the band width, solely by low-pass filters, of the color difference signal $P_R$ to ¼ (1.5 MHz) and of the color difference signal $P_B$ to 1/11 (0.5 MHz). The pixel thinning with a thinning circuit, as in the horizontal pixel number conversion circuit for the luminance signal shown in FIG. 4C, is unnecessary because the number of pixels is already less than 760 by said low-pass filter. Thus the horizontal pixel number conversion circuits 226, 227 for the color difference circuits are solely composed of low-pass filters. Depending on the sampling frequency of the A/D converters 216, 217, the number of pixel signals generated by digitization may not be equal to a multiple of the effective pixel number (760 pixels) in a horizontal scanning period, but, in such case, the number of samples may be varied by an interpolation filter.

The pixel signals subjected to the conversion of number of pixels in a horizontal scanning period by the horizontal pixel number conversion circuits 225, 226, 227 as explained above are then subjected to the conversion of number of scanning lines by the scanning line number conversion circuits 229, 230, 231, which are constructed as shown in FIG. 4A. The entered pixel signals are delayed in the line memory 251 by a horizontal scanning period of the HDTV signal, and supplied to the adder 252. Said adder 252 adds the entered pixel signals and the pixel signals of the preceding horizontal scanning period supplied from the line memory 251, and the obtained sum is multiplied by ½ by the ½ multiplying circuit 253, whereby there is obtained the average value of the pixel signals corresponding to two adjacent scanning lines on the image frame. Then every other horizontal scanning line is skipped by the thinning circuit 254, and the time base is expanded to the horizontal scanning period of the NTSCTV signal by the time base expansion circuit 255.

The luminance signal Y, subjected to the conversion of the number of scanning lines in the scanning line number conversion circuit 229 as explained above, is supplied to the adder 234. On the other hand, the color difference signals $P_R$, $P_B$ are subjected to the conversion of the number of scanning lines in the scanning line number conversion circuits 230, 231, and to the coefficient multiplication in the coefficient multiplying circuits 232, 233 which effect multiplication of coefficients in order to match the amplitudes of the color difference signals $P_R$, $P_B$ of the HDTV signal with the amplitude of the color difference signals I, Q of the NTSCTV signal.

The color difference signals, subjected to the coefficient multiplication in said circuits 232, 233, are added to the luminance signal in the adders 234, 235, and also are subtracted from the luminance signal in the subtractors 236, 237. Terminals a, b, c, d of the selector switch 238 respectively receive signals Y'+I', Y'+Q', Y'−I', Y'−Q', wherein Y' is the luminance signal from the scanning line number conversion circuit 229, I' is the color difference signal from the coefficient multiplying circuit 232, and Q' is the color difference signal from the coefficient multiplying circuit 233. The selector switch 238 cyclically switches the above-mentioned four signals in this order with the timing of frequency $4f_{sc}$, thereby releasing signals Y+I, Y+Q, Y−I, Y−Q, Y+I, Y+Q, ... equivalent to those obtained by two-phase orthogonal modulation with a frequency $f_{sc}$, for supply to a terminal e of the selector switch 239.

The luminance signal Y supplied from the input terminal 211 in FIG. 3 is also supplied to the synchronization separation circuit 221, in which the synchronization signal multiplexed on the luminance signal Y is separated and supplied to the aforementioned control circuit 218 and the synchronization burst generating circuit 228 for the NTSCTV signal. According to the entered synchronization signal, the control circuit 218 determines the effective pixels in each horizontal scanning period, and generates controls signals for the time base expansion circuits 222, 223, 224, thereby controlling the extraction of the pixel signals therein.

Also according to the synchronization signal supplied from the separation circuit 221, the synchronization burst generating circuit 228 generates the synchronization signal and the color burst signal of the NTSCTV signal, for supply to a terminal f of the aforementioned selector switch 239. The switching operation of the selector switch 239 is controlled by a control signal generated by said synchronization burst generating circuit 228 in such a manner that said switch 239 is connected to the terminal f in a period other than the effective pixel signals (namely in the period of synchronization signal and color burst signal), and connected to the terminal e in the period of the effective pixel signals, thereby releasing the NTSCTV signal with attached synchronization signal and color burst signal, in a digital state. Then the D/A converter 240 converts said digital NTSCTV signal into an analog signal with a frequency $4f_{sc}$, thereby releasing the NTSCTV signal from the output terminal 241.

In the present embodiment, the luminance signal Y and the color difference signals $P_R$, $P_B$ of the HDTV signal are not converted into R, G and B color signals but directly converted into the NTSCTV signal. More specifically, signals obtained by digitizing the luminance signal Y and the color difference signals $P_R$, $P_B$ of the HDTV signal are subjected to the extraction of pixel signals in the effective image frame of the NTSCTV signal, and said extracted signals are converted to the number of effective pixels obtained by sampling with a frequency of four times of the color sub carrier frequency $f_{sc}$ of the NTSCTV signal, and the time base is expanded in such a manner that said pixel signals are released with the timing synchronized with said frequency $4f_{sc}$. Then signals equivalent to those obtained by orthogonal two-phase modulation of the color difference signals are formed by additions and subtractions, and thus processed signals are converted again into an analog signal according to a frequency $4f_{sc}$, thereby directly encoding the NTSCTV signal. Thus the hardware can be rendered compact and made smaller, and regulation is no longer required in the encoding of the NTSCTV signal. More specifically, since the sampling frequency for the color difference signals $P_R$, $P_B$ is usually less than ½ of that for the luminance signal Y, the direction conversion of television signal system in the state of signals Y, $P_R$ and $P_B$ allows reduction in the amount of hardware (particularly memory capacity) to about half. A further reduction in the amount of hardware is possible in the conversion of number of scanning lines, by forming the signal of a scanning line of the NTSCTV signal from that of two scanning lines of the HDTV signal, utilizing a fact that the ratio of numbers of scanning lines of the HDTV signal and the NTSCTV signal (1125/525) is close to "2". A reduction in the amount of hardware is also possible in the conversion of number of pixels in a horizontal scanning period, by forming a pixel from two pixels, as in the conversion of number of scanning lines. Furthermore, the D/A conversion conducted in synchronization with a frequency of four times of the color sub carrier frequency $f_{sc}$ of the NTSCTV signal to achieve orthogonal two-phase modulation in the state of digital signals allows a further reduction in the amount of hardware, and enables exact encoding of the NTSCTV signal without adjustment.

Also in case the sampling frequency of the A/D converter is selected close to 74.25 MHz as explained above, a pixel of the luminance signal in the NTSCTV signal is formed from two pixels in the horizontal scanning direction, but a further simplification in the structure can be attained by the use of sub sampling. Furthermore, since the signals of a scanning line of the NTSCTV signal are formed from those of two scanning lines, the present invention can provide similar advantages when it is applied to a television signal converting apparatus employing line sequential color difference signals.

As explained in the foregoing, the present embodiment is capable of directly converting the HDTV signal into the NTSCTV signal without conversion of the luminance and color difference signals into R, G and B color signals, thereby providing advantages of reducting and simplifying the hardware and eliminating the adjustments in the encoding of the NTSCTV signal.

In the following there will be explained a second embodiment of the present invention.

Figure 5:
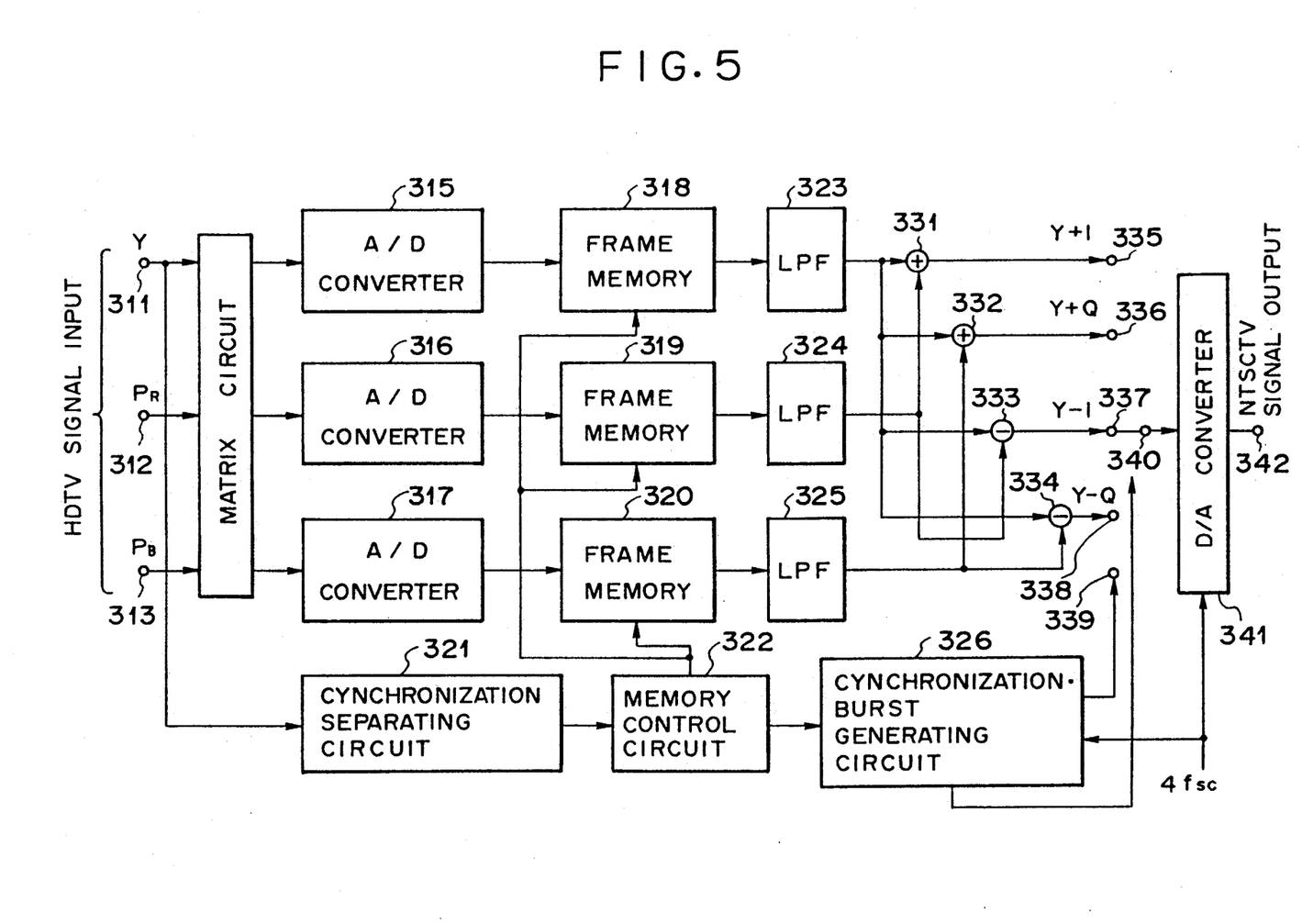
FIG. 5 is a schematic block diagram of a television signal converting apparatus constituting a second embodiment of the present invention.

FIG. 5 is a schematic block diagram of a television signal converting apparatus constituting a second embodiment of the present invention.

In FIG. 5, there are shown an input terminal 311 for receiving the luminance signal Y of the HDTV signal; input terminals 312, 313 for respectively receiving the color difference signals $P_R$, $P_B$ of the HDTV signal; a matrix circuit 314 for converting the signals Y, $P_R$, $P_B$ into signals Y, I, Q; A/D converters 315, 316, 317 for respectively digitizing the analog signals Y, I, Q obtained from said matrix circuit 314; frame memories 318, 319, 320 for respectively storing an image frame of thus digitized signals Y, I, Q; a synchronization separation circuit 321 for separating the synchronization signal from the luminance signal Y of the HDTV signal entered from the input terminal 311; a memory control circuit 322 for controlling the data write-in and read-out of the frame memories 318, 319, 320; low-pass filters (LPF) 323, 324, 325 for band limitation for the signals released from said frame memories 318, 319, 320; adders 331, 332 and subtractors 333, 334 for encoding the HDTV signal into the NTSCTV signal; terminals 335, 336, 337, 338 for respectively receiving pixel data processed by said adders 331, 332 and subtractors 333, 334; a synchronization burst generating circuit 326 for generating the synchronization signal and the color burst signal for the NTSCTV signal in synchronization with a timing signal released from the memory control circuit 322; a terminal 339 for receiving the synchronization signal and the color burst signal generated by said generating circuit 326; a switch 340 for selecting one of the terminals 335-339; a D/A converter 341 for converting the digital signal, released from the switch 341, into an analog signal; and an output terminal 342 for releasing the NTSCTV signal.

In the following there will be explained the function of the second embodiment shown in FIG. 5. The luminance signal Y and the color difference signals $P_R$, $P_B$ entered respectively from the input terminals 311, 312, 313 are converted in the matrix circuit 314 into the Y, I and Q signals, which are then digitized respectively in the A/D converters 315, 316, 317 and stored, by an image frame, in the frame memories 318, 319, 320. Also the synchronization separation circuit 321 separates the synchronization signal from the luminance signal Y of the HDTV signal entered from the input terminal 311, and sends said synchronization signal to the memory control circuit 322.

Figure 6:
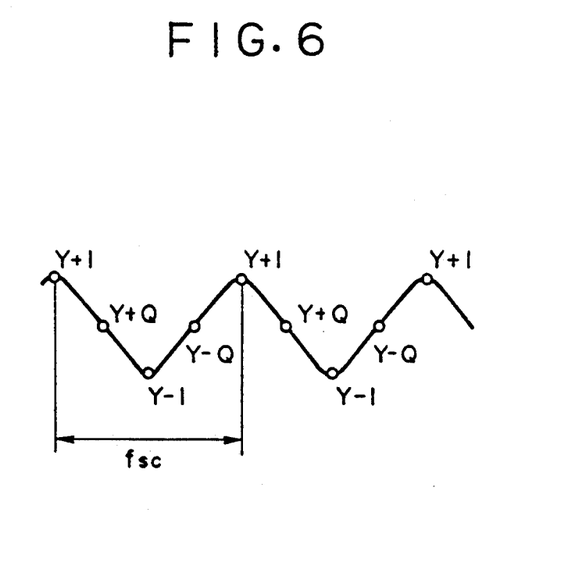
FIG. 6 is a wave form chart of an NTSCTV signal released from an output terminal 342 in FIG. 5.

According to said synchronization signal of the HDTV signal from said separation circuit 321, the memory control circuit 322 generates write-in addresses for the frame memories 318, 319, 320, thereby controlling the write-in operation thereof. At the signal read-out from the frame memories 318, 319, 320, the memory control circuit 322 controls said frame memories in such a manner that the time base is expanded at the signal read-out corresponding to the difference in aspect ratio between the HDTV signal and the NTSCTV signal, thereby achieving conversion of aspect ratio of the television signal. For aspect ratios of 16:9 for the HDTV signal and 4:3 for the NTSCTV signal, the time base is expanded by 16/12 =4/3 times at the signal read-out. The signals Y, I, Q thus subjected to the time base expansion are subjected to band limitation in the low-pass filters 23, 324, 325, and supplied to the adders 331, 332 and the subtractors 333, 334, which respectively form signals Y+I, Y+Q, Y−I and Y−Q from the luminance signal Y and the color difference singals I, Q and supply these signals respectively to the terminals 335-338. According to a control signal supplied from the synchronization burst generating circuit 326, the switch 340 selects the signal of the terminal 339 in the period of the synchronization signal and color burst signal, and the signals supplied to the terminals 335, 336, 337, 338 in other period (namely in the effective image signal period) in succession in synchronization with a timing signal of a frequency $4f_{sc}$ ($f_{sc}$ being the frequency of color sub carrier). Consequently the D/A converter 341 receives the signals in the order of Y+I, Y+Q, Y−I, Y−Q during the effective image signal period. Said D/A converter 341 converts these digital signals into an analog signal, thus releasing the NTSCTV signal of a wave form as shown in FIG. 6, from the output terminal 342.

The low-pass filters 323, 324, 325 shown in FIG. 5, are composed of digital filters, and respectively have passing band in the horizontal direction of 4.2 MHz for the signal Y, 1.5 MHz for the signal I and 0.5 MHz for the signal Q, but the band limitation for the signal Y may be dispensed with depending on the equipment to be connected. With respect to the band limitation in the vertical direction, based on the ratio 1125:525 of the scanning lines of the HDTV and NTSCTV signals, there may be employed an interpolation filter for forming signals of 7 scanning lines of the NTSCTV signal from those of 15 scanning lines of the HDTV signal, but, more simply, there may be employed a structure for forming signals of a scanning line of the NTSCTV signal by averaging the signals of two scanning lines of the HDTV signal.

Also in case the conversion of field frequency from the HDTV signal (60 Hz) to the NTSCTV signal (59.94 Hz) is not adopted, each of the frame memories 318, 319, 320 shown in FIG. 5 is only required to store the signals of two horizontal scanning periods, so that the hardware can be further simplified.

The foregoing embodiments have been limited to the conversion of the HDTV signal into the NTSCTV signal, but the present invention is not limited to such case and is likewise applicable, for example, to the conversion of the HDTV signal into the PALTV signal.

The present embodiment, as explained above, employs D/A conversion of the digitized NTSCTV signal with a frequency $4f_{sc}$ of four times of the color sub-carrier frequency $f_{sc}$ of the NTSCTV signal, in the conversion of the HDTV signal into the NTSCTV signal, whereby the encoder for NTSCTV signal can be solely composed of adders and subtractors, and there is required only one D/A converter. Thus there are obtained advantages of significant simplification of the hardware structure and very precise encoding of the NTSCTV signal based on the orthogonal two-phase modulation conducted in the digital signal state.

What is claimed is:

1. A television format converting apparatus for converting a first television signal of a first aspect ratio, which includes a luminance signal and first and second color difference signals, into a second television signal of a second aspect ratio, which includes a luminance signal component and color signal component, comprising:

a) analog-digital converter means for digitizing said first television signal and outputting a digitized first television signal;

b) luminance signal converting means for converting the digitized luminance signal contained in the digitized first television signal output from said analog-digital converter means into a luminance signal corresponding to said second television signal;

c) first color difference signal converter means for converting the digitized first color difference signal contained in the digitized first television signal output from said analog-digital converter means into a first color difference signal corresponding to said second television signal;

d) second color difference signal converter means for converting the digitized second color difference signal contained in the digitized first television signal output from said analog-digital converter means into a second color difference signal corresponding to said second television signal;

e) first adder means for adding the luminance signal output from said luminance signal converter means and the first color difference signal output from said first color difference signal converter means;

f) second adder means for adding the luminance signal output from said luminance signal converter means and the second color difference signal output from said second color difference signal converter means;

g) first subtractor means for subtracting the first color difference signal output from said first color difference signal converter means, from the luminance signal output from said luminance signal converter means;

h) second subtractor means for subtracting the second color difference signal output from said second color difference signal converter means from the luminance signal output from said luminance signal converter means; and i) output switching means for outputting, in succession, the signal from said first adder means, that from said second adder means, that from said first subtractor means and that from said second subtractor means, in synchronization with a frequency of four times the color sub carrier frequency of said second television signal; and j) digital-analog converter means for converting a signal output from said output switching means into an analog signal in synchronization with a frequency of four times the color sub carrier frequency of said second television signal.

2. An apparatus according to claim 1, wherein said television format converting apparatus further includes:
   k) synchronization signal separating means for separating and outputting a synchronization signal contained in said first television signal;
   l) signal generator means for generating a synchronization signal and a burst signal of said second television signal, utilizing the synchronization signal of said first television signal output from said synchronization signal separating means; and
   m) signal adder means for adding the synchronization signal and the burst signal of said second television signal, generated by said signal generator means, to the signals output from said output switching means.

3. An apparatus according to claim 1, wherein said luminance signal converter means includes:
   1) time base varying means for varying the time base of the digitized luminance signal, contained in the digitized first television signal output from said analog-digital converter means;
   2) horizontal sample number converter means for converting the number of samples in the horizontal scanning direction in the digitized luminance signal of which time base is varied by said time base varying means; and
   3) scanning line number converter means for converting the number of horizontal scanning lines in the digitized luminance signal output from said horizontal sample number converter means.

4. An apparatus according to claim 3, wherein said time base varying means includes memory means for temporarily storing the digitized luminance signal, contained in the digitized first television signal output from said analog-digital converter means, and reading the stored digitized luminance signal with a rate different from that at the time of storage.

5. An apparatus according to claim 1, wherein said first color difference signal converter means includes:
   1) time base varying means for varying the time base of the digitized first color difference signal contained in the digitized first television signal output from said analog-digital converter means;
   2) horizontal sample number varying means for converting the number of samples in the horizontal scanning direction in the digitized first color difference signal of which time base is varied by said time base varying means;
   3) scanning line number converter means for converting the number of horizontal scanning lines in the digitized first color difference signal output from said horizontal sample number converter means; and
   4) level varying means for varying the digitized first color difference signal output from said scanning line number varying means.

6. An apparatus according to claim 5, wherein said time base varying means includes memory means for temporarily storing the digitized first color difference signal, contained in the digitized first television signal output from said analog-digital converter means and reading the stored digitized first color difference signal with a rate different from that at the time of storage.

7. An apparatus according to claim 1, wherein said second color difference signal converter means includes:
   1) time base varying means for varying the time base of the digitized second color difference signal contained in the digitized first television output from said analog-digital converter means;
   2) horizontal sample number converter means for converting the number of samples in the horizontal scanning direction in the digitized second color difference signal of which time base is varied by said time base varying means;
   3) scanning line number converter means for converting the number of horizontal scanning lines of the digitized second color difference signal output from said horizontal sample number converter means; and
   4) level varying means for varying the level of the digitized second color difference signal output from said scanning line number converter means.

8. An apparatus according to claim 7, wherein said time base varying means includes memory means for temporarily storing the digitized second color difference signal, contained in the digitized first television signal output from said analog-digital converter means, and reading the stored digitized second color difference signal with a rate different from that at the time of storage.

9. An apparatus according to claim 1, wherein said luminance signal converter means includes:
   1) time base expansion means for expanding the time base of the digitized luminance signal contained in the digitized first television signal output from said analog-digital converter means;
   2) horizontal sample number reducing means for reducing the number of samples in the horizontal scanning direction in the digitized luminance signal of which time base is expanded by said time base expanding means; and
   3) scanning line number reducing means for reducing the number of horizontal scanning lines in the digitized luminance signal output from said horizontal sample number reducing means.

10. An apparatus according to claim 9, wherein said time base expansion means includes memory means for temporarily storing the digitized luminance signal, contained in the digitized first television signal output from said analog-digital converter means, and reading the stored digitized luminance signal with a rate lower than that at the time of storage.

11. An apparatus according to claim 1, wherein said first color difference signal converter means includes:
   1) time base expansion means for expanding the time base of the digitized first color difference signal, contained in the digitized first television signal output from said analog-digital converter means;
   2) horizontal sample number reducing means for reducing the number of samples in the horizontal scanning direction in the digitized first color difference signal of which time base is expanded in said time base expansion means;
   3) scanning line number reducing means for reducing the number of horizontal scanning lines in the digitized first color difference signal output from said horizontal sample number reducing means; and
   4) level varying means for varying the level of the digitized first color difference signal output from said scanning line number reducing means.

12. An apparatus according to claim 11, wherein said time base expansion means includes memory means for temporarily storing the digitized first color difference signal, contained in the digitized first television signal output from said analog-digital converter means, and reading the stored digitized first color difference signal with a rate lower than that at the time of storage.

13. An apparatus according to claim 1, wherein said second color difference signal converter means includes:
1) time base expansion means for expanding the time base of the digitized second color difference signal, contained in the digitized first television signal output from said analog-digital converter means;
2) horizontal sample number reducing means for reducing the number of samples in the horizontal scanning direction in the digitized second color difference signal of which time base is expanded by said time base expansion means;
3) scanning line number reducing means for reducing the number of horizontal scanning lines in the digitized second color difference signal output from said horizontal sample number reducing means; and
4) level varying means for varying the level of the digitized second color difference signal output from said scanning line number reducing means.

14. An apparatus according to claim 13, wherein said time base expansion means includes memory means for temporarily storing the digitized second color difference signal, contained in the digitized first television signal output from said analog-digital converter means, and reading the stored digitized second color difference signal with a rate lower than that at the time of storage.

15. A television format converting apparatus for converting a first television signal of a first aspect ratio, which includes a luminance signal component and color signal component, into a second television signal of a second aspect ratio, which includes a luminance signal component and color signal component, comprising:
 a) analog-digital converter means for digitizing said first television signal and outputting a digitized first television signal;
 b) television signal conversion means for converting the digitized luminance signal component contained in the digitized first television signal outputted from said analog-digital converter means, into a luminance signal component corresponding to said second television signal and for converting the digitized color signal component contained in the digitized first signal outputted from said analog-digital converter means, into a color signal component corresponding to said second television signal;
 c) operation processing means for operating the luminance signal component and color signal component output from said television signal conversion means; and
 d) digital-analog converter means for converting a signal outputted from said operation processing means, into an analog signal in synchronization with a frequency of four times the color sub carrier frequency of said second television signal.

16. An apparatus according to claim 15, wherein said first television signal has a resolving power higher than that of said second television signal.

17. An apparatus according to claim 15, wherein said second aspect ratio is different from said first aspect ratio.

18. An apparatus according to claim 15, wherein said first television signal includes a luminance signal and first and second color difference signals, and said analog-digital converter means is arranged to digitize each of the luminance signal and first and second color difference signals of said first television signal.

19. An apparatus according to claim 18, wherein said television signal converter means includes:
1) luminance signal converter means for converting the digitized luminance signal contained in the digitized first television signal output from said analog-digital converter means, into a luminance signal corresponding to said second television signal;
2) first color difference signal converter means for converting the digitized first color difference signal contained in the digitized first television signal output from said analog-digital converter means, into a first color difference signal corresponding to said second television signal; and
3) second color difference signal converter means for converting a digitized second color difference signal contained in the digitized second television signal output from said analog-digital converter means, into a second color difference signal corresponding to said second television signal.

20. An apparatus according to claim 19, wherein said operation processing means includes:
1) first adder means for adding the luminance signal output from said luminance signal converter means and the first color difference signal output from said first color difference signal converter means;
2) second adder means for adding the luminance signal output from said luminance signal converter means and the second color difference signal output from said second color difference signal converter means;
3) first subtractor means for subtracting the first color difference signal output from said first color difference signal converter means, from the luminance signal output from said luminance signal converter means;
4) second subtractor means for subtracting the second color difference signal output from said second color difference signal converter means, from the luminance signal output from said luminance signal converter means;
5) output switching means for outputting, in succession, the signal from said first adder means, that from said second adder means, that from said first subtractor means and that from said second subtractor means, in synchronization with a frequency of four times the color sub carrier frequency of said second television signal.

21. An apparatus according to claim 20, further including:
1) synchronization signal separating means for separating and outputting a synchronization signal contained in said first television signal;
2) signal generator means for generating a synchronization signal and a burst signal of said second television signal, utilizing the synchronization signal of said first television signal output from said synchronization signal separating means; and
3) signal adder means for adding the synchronization signal and the burst signal of said second television signal, generated by said signal generator means, to the signals output from said output switching means.

22. An apparatus according to claim 19, wherein said luminance signal converter means includes:

1) time base varying means for varying the time base of the digitized luminance signal contained in the digitized first television signal output from said analog-digital converter means;
2) horizontal sample number converter means for converting the number of samples in the horizontal scanning direction in the digitized luminance signal of which time base is varied by said time base varying means; and
3) scanning line number converter means for converting the number of horizontal scanning lines in the digitized luminance signal output from said horizontal sample number converter means.

23. An apparatus according to claim 22, wherein said time base varying means includes memory means for temporarily storing the digitized luminance signal contained in the digitized first television signal output from said analog-digital converter means, and reading the stored digitized luminance signal with a rate different from that at the time of storage.

24. An apparatus according to claim 19, wherein said first color difference signal converter means includes:
1) time base varying means for varying the time base of the digitized first color difference signal contained in the digitized first television signal output from said analog-digital converter means;
2) horizontal sample number varying means for converting the number of samples in the horizontal scanning direction in the digitized first color difference signal of which time base is varied by said time base varying means;
3) scanning line number converter means for converting the number of horizontal scanning lines in the digitized first color difference signal output from said horizontal sample number converter means; and
4) level varying means for varying the digitized first color difference signal output from said scanning line number varying means.

25. An apparatus according to claim 24, wherein said time base varying means includes memory means for temporarily storing the digitized first color difference signal contained in the digitized first television signal output from said analog-digital converter means and reading the stored digitized first color difference signal with a rate different from that at the time of storage.

26. An apparatus according to claim 19, wherein said second color difference signal converter means includes:
1) time base varying means for varying the time base of the digitized second color difference signal contained in the digitized first television signal output from said analog-digital converter means;
2) horizontal sample number converter means for converting the number of samples in the horizontal scanning direction in the digitized second color difference signal of which time base is varied by said time base varying means;
3) scanning line number converter means for converting the number of horizontal scanning lines of the digitized second color difference signal output from said horizontal sample number converter means; and
4) level varying means for varying the level of the digitized second color difference signal output from said scanning line number converter means.

27. An apparatus according to claim 26, wherein said time base varying means includes memory means for temporarily storing the digitized second color difference signal contained in the digitized first television signal output from said analog-digital converter means, and reading the stored digitized second color difference signal with a rate different from that at the time of storage.

28. An apparatus according to claim 19, wherein said luminance signal converter means includes:
1) time base expansion means for expanding the time base of the digitized luminance signal contained in the digitized first television signal output from said analog-digital converter means;
2) horizontal sample number reducing means for reducing the number of samples in the horizontal scanning direction in the digitized luminance signal of which time base is expanded by said time base expanding means; and
3) scanning line number reducing means for reducing the number of horizontal scanning lines in the digitized luminance signal output from said horizontal samples number reducing means.

29. An apparatus according to claim 28, wherein said time base expansion means includes memory means for temporarily storing the digitized luminance signal contained in the digitized first television signal output from said analog-digital converter means, and reading the stored digitized luminance signal with a rate lower than that in the storage.

30. An apparatus according to claim 19, wherein said first color difference signal converter means includes:
1) time base expansion means for expanding the time base of the digitized first color difference signal contained in the digitized first television signal output from said analog-digital converter means;
2) horizontal sample number reducing means for reducing the number of samples in the horizontal scanning direction in the digitized first color difference signal of which time base is expanded in said time base expansion means;
3) scanning line number reducing means for reducing the number of horizontal scanning lines in the digitized first color difference signal output from said horizontal sample number reducing means; and
4) level varying means for varying the level of the digitized first color difference signal output from said scanning line number reducing means.

31. An apparatus according to claim 30, wherein said time base expansion means includes memory means for temporarily storing the digitized first color difference signal contained in the digitized first television signal output from said analog-digital converter means, and reading the stored digitized first color difference signal with a rate lower than that at the time of storage.

32. An apparatus according to claim 19, wherein said second color difference signal converter means includes:
1) time base expansion means for expanding the time base of the digitized second color difference signal, contained in the digitized first television signal output from said analog-digital converter means;
2) horizontal sample number reducing means for reducing the number of samples in the horizontal scanning direction ion the digitized second color difference signal of which time base is expanded by said time base expansion means;
3) scanning line number reducing means for reducing the number of horizontal scanning lines in the digitized second color difference signal output from said horizontal sample number reducing means; and 4) level varying means for varying the level of the digitized second color difference signal output from said scanning line number reducing means.

33. An apparatus according to claim 32, wherein said time base expansion means includes memory means for temporarily storing the digitized second color difference signal contained in the digitized first television signal output from said analog-digital converter means, and reading the stored digitized second color difference signal with a rate lower than that at the time of storage.

34. A television format converting apparatus for converting a first television signal of a first aspect ratio, which includes a luminance signal component and color signal component, into a second television signal of a second aspect ratio, which includes a luminance signal component and color signal component, comprising:

1) analog-digital converter means for digitizing said first television signal and outputting a digitized first television signal;

b) time base varying means for varying the time base of the digitized luminance signal component contained in the digitized first television signal output from said analog-digital converter means, to a time base corresponding to said second television signal and for varying the time base of the digitized color signal component contained in the digitized first television signal output from said analog-digital converter means, to a time base corresponding to said second television signal;

c) band limiting means for applying a band limitation to each of the luminance signal component and color signal component output from said time base varying means; and d) digital-analog converter means into an analog signal output from said band limiting means into an analog signal in synchronization with a frequency of four times the color sub carrier frequency of said second television signal.

35. An apparatus according to claim 34, wherein said first television signal has a resolving power higher than that of said second television signal.

36. An apparatus according to claim 34, wherein the first aspect ratio and the second aspect ratio are different from each other.

37. An apparatus according to claim 34, wherein said time base varying means includes memory means for temporarily storing the luminance signal component and color signal component output from said analog-digital converter means and reading the stored luminance signal component and color signal component with a rate different from that at the time of storage.

38. An apparatus according to claim 34, wherein said band limiting means includes a digital filter for limiting the frequency band region in the horizontal and vertical directions in each of the luminance signal component and color signal component output from said time base varying means.

* * * * *

UNITED STATES PATENT AND TRADEMARK OFFICE
CERTIFICATE OF CORRECTION

PATENT NO. : 5,307,156
DATED : April 26, 1994
INVENTOR(S) : Toshinori Yamamoto; Hisha Ishikawa It is certified that error appears in the above-indentified patent and that said Letters Patent is hereby corrected as shown below:

```
Abstract Line 5   Change "other" to --another--
         Line 9   After "converted" insert --into--
         Line 11  delete "of"
         Fig.5 change "cynchronization" to --synchronization--
         (two occurrences)
Column,  2 Line 63 After "of" insert --the--
         3 Line  5 Change "sub carrier" to --sub-carrier--
         3 Line 14 delete "of" (second occurrence) and
                   change "sub" to --sub- --
         3 Line 30 delete "of" and change "sub carrier"
                                 to --sub-carrier--
         3 Line 42 delete "of" (second occurrence) and change
                   "sub carrier" to --sub-carrier--
         4 Line 35 delete "of" (second occurrence) and change
                   "sub carrier" to --sub-carrier--
         7 Line 50 after "of" insert --a--
         7 Line 65 delete "of" (second occurrence)
         7 Line 66 change "sub carrier" to --sub-carrier--
         8 Line  8 change "sub sampling" to --sub-sampling--
```

UNITED STATES PATENT AND TRADEMARK OFFICE
CERTIFICATE OF CORRECTION

PATENT NO. : 5,307,156
DATED : April 26, 1994
INVENTOR(S) : Toshinori Yamamoto; Hisha Ishikawa It is certified that error appears in the above-indentified patent and that said Letters Patent is hereby corrected as shown below:

```
19 Line 20 change "reducting" to --rendering more
              compact--
 9 Line 20 change "23" to --323--
 9 Line 23 change "singals" to --signals--
 9 Line 33 change "sub carrier" to --sub-carrier--
 9 Line 41 after "have" insert --a--
 9 Line 64 after "such" insert --a--
11 Line  1 change "sub carrier to --sub-carrier--
14 Line 50 change "sub carrier to --sub-carrier--
18 Line  7 change "into an analog" to --for converting a-
18 Line 10 change "sub carrier" to --sub-carrier--
```

Signed and Sealed this

Fourth Day of October, 1994

Attest:

BRUCE LEHMAN

Attesting Officer

Commissioner of Patents and Trademarks